US012490139B2

(12) United States Patent
Kahn et al.

(10) Patent No.: US 12,490,139 B2
(45) Date of Patent: Dec. 2, 2025

(54) METHOD TO SUPPORT 5G TIME SENSITIVE COMMUNICATIONS

(71) Applicant: Nokia Technologies Oy, Espoo (FI)

(72) Inventors: Colin Kahn, Morris Plains, NJ (US); Kimmo Kettunen, Espoo (FI); Thomas Theimer, Baierbrunn (DE)

(73) Assignee: Nokia Technologies Oy, Espoo (FI)

( * ) Notice: Subject to any disclaimer, the term of this patent is extended or adjusted under 35 U.S.C. 154(b) by 532 days.

(21) Appl. No.: 17/292,321

(22) PCT Filed: Nov. 19, 2018

(86) PCT No.: PCT/US2018/061868
§ 371 (c)(1),
(2) Date: May 7, 2021

(87) PCT Pub. No.: WO2020/106274
PCT Pub. Date: May 28, 2020

(65) Prior Publication Data
US 2021/0400524 A1 Dec. 23, 2021

(51) Int. Cl.
*H04W 28/02* (2009.01)
*H04W 40/02* (2009.01)
(52) U.S. Cl.
CPC ....... *H04W 28/0268* (2013.01); *H04W 40/02* (2013.01)
(58) Field of Classification Search
None
See application file for complete search history.

(56) References Cited

U.S. PATENT DOCUMENTS

2015/0327323 A1\* 11/2015 Wang ............... H04W 76/27
370/311
2018/0237040 A1\* 8/2018 Mong .................. H04L 67/61
2022/0061063 A1\* 2/2022 Patel ................. H04W 28/0268

OTHER PUBLICATIONS

3GPP TR 23.734 V0.3.0 (Oct. 2018) 3rd Generation Partnership Project; Technical Specification Group Services and System Aspects; Study on 5GS Enhanced support of Vertical and LAN Services (Release 16) (Year: 2018).\*
Patel—U.S. Appl. No. 62/734,338, filed Sep. 21, 2018 (Year: 2018).\*

(Continued)

*Primary Examiner* — Andre Tacdiran
(74) *Attorney, Agent, or Firm* — Duft & Bornsen, PC (57) ABSTRACT

In some example embodiments, there may be provided a method that includes generating, by an application function and based on a time sensitive communication requirement for one or more end stations, at least one quality of service parameter for a time sensitive communication path from a talker end station through at least a portion of a 5G system to a listener end station; and sending, by the application function, a request towards a policy control function, the request including the at least one quality of service parameter configured to enable a creation, at the one or more 5G nodes, of a quality of service flow in accordance with the at least one quality of service parameter, wherein the one or more 5G nodes comprise a user plane function and/or at least one base station. Related systems, methods, and articles of manufacture are also disclosed.

12 Claims, 7 Drawing Sheets

(56) References Cited

OTHER PUBLICATIONS

Huawei et al: "QOS Negotiation between 3GPP and TSN networks KI#3.1", 3GPP Draft; S2-1810475 TR23.734 Solution for KI 3 QOS Negotiation Between 3GPP and TSN Networks V2, 3rd Generation Partnership Project (3GPP), F-06 vol. SA WG2, No. Dongguan, China; Oct. 15, 2018-Oct. 19, 2018 Oct. 9, 2018 (Oct. 9, 2018).

"3rd Generation Partnership Project; Technical Specification Group Services and System Aspects; Study on 5GS Enhanced support of Vertical and LAN Services (Release 16)", 3GPP Standard; Technical Report; 3GPP TR 23.734, 3rd Generation Partnership Project (3GPP), No. V0.3.0, Oct. 31, 2018 (Oct. 31, 2018), pp. 1-94.

Nokia et al.: "TSN—QOS Framework", 3GPP Draft; S2-1811433-TSN-QOSFRAMEWORK-V4, 3rd Generation Partnership Project (3GPP), F-06921 Sophia-Antipolis Cedex ; France vol. SA WG2, No. Dongguan, China; Oct. 15, 2018-Oct. 19, 2018 Oct. 18, 2018 (Oct. 18, 2018).

"3rd Generation Partnership Project; Technical Specification Group Services and System Aspects; Study on Communication for automation in Vertical Domains (Release 15)", 3GPP Standard; Technical Report; 3GPP TR 23.734, 3rd Generation Partnership Project (3GPP), No. V0.2.0, Aug. 2017 (Aug. 2018), pp. 1-91.

\* cited by examiner

METHOD TO SUPPORT 5G TIME SENSITIVE COMMUNICATIONS

CROSS REFERENCE TO RELATED APPLICATIONS

This application is a national phase entry of Patent Cooperation Treaty Application No. PCT/US2018/061868 filed Nov. 19, 2018, entitled "METHOD TO SUPPORT 5G TIME SENSITIVE COMMUNICATIONS," the disclosure of which is incorporated herein by reference in its entirety.

FIELD

The subject matter described herein relates to time sensitive communications over a cellular wireless system.

BACKGROUND

Time sensitive communications (TSC) may be used to support a variety of applications including applications such as ultra-reliable low-latency communications (UR-LLC), industrial verticals, and/or the like. In the case of industrial verticals including networks, there may be some requirements that are relatively unique, such as certain requirements for low latency, deterministic data transmission, and high reliability, when compared to other 5G cellular services. To that end, the IEEE provides a suite of Time Sensitive Network (TSN) specifications to allow synchronization of bridges to grand master clocks (see, e.g., IEEE-1588 and IEEE 802.1AS), link layer bridge discovery (IEEE 802.1AB), provisioning of streams including gate scheduling along the path between TSN endpoints (IEEE 802.1Qcc and IEEE 802.1Qbv), frame replication for reliability (IEEE 802.1CB), and other protocols to enable isochronous transmission to connect endpoints across Ethernet bridges.

SUMMARY

Methods and apparatus, including computer program products, are provided for time sensitive communications.

In some example embodiments, there may be provided a method that includes generating, by an application function and based on a time sensitive communication requirement for one or more end stations, at least one quality of service parameter for a time sensitive communication path from a talker end station through at least a portion of a 5G system to a listener end station, wherein the at least one quality of service parameter is indicative of a scheduled gate time for transmission at one or more 5G nodes in the time sensitive communication path; and sending, by the application function, a request towards a policy control function, the request including the at least one quality of service parameter configured to enable a creation, at the one or more 5G nodes, of a quality of service flow in accordance with the at least one quality of service parameter, wherein the one or more 5G nodes comprise a user plane function and/or at least one base station.

In some variations, one or more of the features disclosed herein including the following features can optionally be included in any feasible combination. The application function may receive 5G system topology information including transport delay times for the one or more 5G nodes in the time sensitive communication path between the talker end station and the listener end station. The quality of service flow, in accordance with the at least one quality of service parameter, may provide one or more deterministic traffic flows. The application function may calculate, based on received information, a transport delay between the talker end station and the listener end station, the at least one quality of service parameter determined, based on the calculated transport delay. The talker end station and/or the listener end station may wirelessly couple to at least one radio access network via at least one base station. The user plane function and/or the at least one base station may be configured with the at least one quality of service parameter indicative of scheduled gate times. The talker end station and the listener end station may be configured with the at least one quality of service parameter indicative of scheduled gate times. The at least one quality of service parameter indicative of scheduled gate times may be applied to packets sent and/or may be received by the at least one base station and/or the user plane function. The talking end station and/or the listener end station may directly couple to a user plane function via an N6 interface. The user plane function may be co-located with the at least one base station and/or may be separate from the at least one base station. The one or more 5G nodes may include a user equipment, the at least one base station comprising a gNB, and/or a bridge between the gNB and the user plane function. The user equipment comprises, or is comprised in, the talking end station and/or the listener end station. The application function may provide a first interface, in accordance with IEEE 802.1Qcc, to a central user configuration function and/or a central network configuration (CNC) function to enable receiving at least the time sensitive communication requirement. The application function may provide, to the 5G system, a second interface to one or more 5G nodes. The time sensitive communication path may be among the talker end station to a plurality of listener end stations, wherein the time sensitive communication path is through at least the portion of the 5G system. The application function may send the request towards policy control function via a network exposure function. The at least one quality of service parameter indicative of scheduled gate times for transmission may enable the scheduling of flow transmissions among the 5G nodes in the path from talking end station to the listener end-station. Each of the one or more 5G nodes along the time sensitive communication path may have a corresponding scheduled gate time for transmission of the user plane traffic to provide a deterministic path for the user plane traffic.

In some example embodiments, there may be provided a method that includes receiving, at a 5G node in a time sensitive communication path from a talker end station through at least a portion of a 5G system to a listener end station, a request including at least one quality of service parameter indicative of a scheduled gate time for transmission and/or reception at the 5G node on the time sensitive communication path; and creating, at the 5G node, a quality of service flow in accordance with the at least one quality of service parameter indicative of a scheduled gate time for transmission and/or reception at the 5G node on the time sensitive communication path.

In some variations, one or more of the features disclosed herein including the following features can optionally be included in any feasible combination. The 5G node may include a base station and/or a user plane function. The creating may be based on a protocol data unit session establishment or a protocol data unit session modification of the quality of service flow. The request may include a Namf message including the at least one quality of service parameter indicative of the scheduled gate time. The at least one quality of service parameter indicative of the scheduled gate time may be determined based on a transport delay between the talker end station and the listener end station. The at least one quality of service parameter indicative of scheduled gate times may enable the scheduling of flow transmissions among 5G nodes in the path from talking end station to at least one listener end station. Each of the 5G nodes along the time sensitive communication path may have a corresponding scheduled gate time for transmission of the user plane traffic. The user plane function may be co-located with the base station and/or is separate from the base station. The request may be received from a session management function, a policy control function, and/or an application function. The 5G node may transmit one or more packets at the scheduled gate times. The 5G node may receive one or more packets at the scheduled gate times.

In some example embodiments, there may be provided a method that includes receiving, at an end station including a user equipment, at least one quality of service parameter indicative of a scheduled gate time for transmission on a time sensitive communication path through at least a portion of a 5G system; and transmitting, at the end station including a user equipment, one or more packets at the scheduled gate time towards a 5G node.

In some variations, one or more of the features disclosed herein including the following features can optionally be included in any feasible combination. The 5G node may include a base station and/or a user plane function. The at least one quality of service parameter may be received from a base station via a radio resource control configuration message. The end station including the user equipment may directly couple to the user plane function via an N6 interface. The user plane function may be co-located with a base station and/or is separate from the base station. The base station may comprise a gNB. The end station including the user equipment may couple wirelessly to the 5G node. The at least one quality of service parameter indicative of the scheduled gate time may be determined based on a transport delay between a talker end station and a listener end station. The end station including the user equipment may include the talker end station. The time sensitive communication path through at least the portion of the 5G system may include a talker end station and at least one listener end station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

As noted above, time sensitive communications (TSC) may be used to support applications such as ultra-reliable low-latency communications (UR-LLC), industrial verticals, and/or the like. In the case of the 3GPP time sensitive communications, a fully centralized configuration model of the IEEE's TSN may be adopted as a starting point in the 3GPP framework. For example, end station requirements for transmissions may be provided through a central user configuration (CUC) function to a central network configuration (CNC) function that also discovers the synchronized, bridged network topology and other information regarding the bridges including bridge latencies. The CNC may formulate gate schedules provisioned by the CNC at each bridge in a communication path between the end station talker and end station listener. The gate schedule at each bridge may specify the absolute times and the periodicity for transmission of user plane frames. This may enable very low latency communication for deterministic traffic between endpoints, supporting industrial applications such as real-time machine control and the like.

The approach taken in some early 3GPP proposals suggests integrating the 5G system into wired TSN networks by viewing the 5G system as a bridge (or a link) in an external TSN network. In this model, the 5G system would be adapted to appear as a bridge/link to the TSN network, which is left unaltered. However, integrating the 5G system with TSN networks raises numerous issues. For example, the TSN network components, such as the CNC and bridges, may be part of a wired network infrastructure and may often be provided by other network vendors. Supporting the 5G system within the TSN network may thus require multi-vendor integration with these other vendors, some of which may not have open or standardized interfaces to allow integration with sometimes competing 5G system manufacturers. Second, translators may be needed to covert between the IEEE's TSN-related protocols and the 3GPP protocols as these two protocols were not designed to interact. Third, in some variants of the integration model, there may be no support for TSN on 3GPP wired interfaces (e.g., the N3 interface, the F1 interface, etc.) within the 5G system. Depending on the 5G user plane function (UPF) location, these interfaces may encompass all or most of the network between endpoints. In other variants, wired 5G system elements may be modeled as bridges, so the TSN protocols may need to operate across both the 5G system and the wired TSN network domains. Fourth, some functions performed by the TSN management plane (e.g., CNC configuration of gate schedules) may be performed by the 5G system control plane (e.g., configuration of QoS). As such, there may be a mismatch between relatively static support for IEEE TSN configuration and the more dynamic 5G support for QoS and other features in 3GPP. Fifth, in 5G system bridge/link models, the user equipment (UE) may serve as a bridge port. For industrial IoT however, a UE may be associated with an end station and register with the 5G system when the end station (e.g., a robot, a controller, etc.) is brought on-line. As such, the bridge port "appears" and "disappears," whenever end stations are deployed, which may alter the bridged network topology (at least from the perspective of the CNC). Sixth, both the TSN network and the 5G system may independently support IEEE-1588/IEEE-802.1AS clock synchronization. Integrating the TSN network and the 5G system may require support for multiple grand master (GM) clocks, coordination between the two TSN time domains, or support by the 5G system of synchronization from a TSN bridge running gPTP (e.g., via a transparent clock). The above-noted list makes clear that the prior approach viewing the 5G system as a bridge/link in an external TSN network may create a variety of complex problems.

In some example embodiments, there may be provided a standalone 5G TSC network, which does not rely on integration with an external TSN.

In some example embodiments, there is provided 5G system support for time sensitive communications (TSC) by providing a standalone TSC solution supported by the 5G system, which may reduce or eliminate the need for an external TSN network.

In some example embodiments, there is provided a TSC configurator, which may be implemented at a 5G node as an Application Function (AF). The TSC configurator may configure the 5G systems with one or more TSC paths between end stations. These TSC paths may be configured using a QoS that provides transmission in accordance with gated schedules, which specify the transmit time and/or the periodicity of the transmission for one or more interfaces in the 5G system (including, for example, the for 5G air interface transmission over the 5G radio access network). Along a TSC path, each 5G node may (e.g., user equipment, gNB, UPF, etc.) along a TSC communication path may have a corresponding gated schedule. These gated schedules may provide a deterministic, low-delay TSC communication path, in accordance with some example embodiments. In some example embodiments, a Protocol Data Unit (PDU) session modification or establishment message may be used to configure the QoS for the TSC.

Figure 1A:
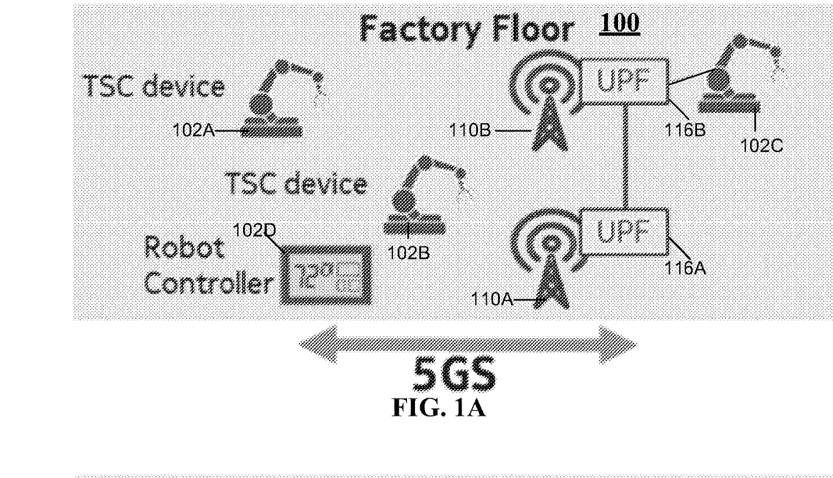
FIGS. 1A-1B depict examples of portions of a 5G system configured to provide time sensitive communications between end stations, in accordance with some example embodiments.

FIG. 1A depicts an example of a portion of a 5G TSC network 100, in accordance with some example embodiments.

In the example of FIG. 1A, the TSC network 100 may be considered standalone in the sense that network 100 may eliminate the need for an external, separate TSN network. Instead, the network 100 may provide a standalone 5G TSC solution over the 5G system. The 5G TSC network 100 may be located over a coverage area, which in this example is a factory floor, although the network 100 may cover other types of areas to provide the TSC service.

Figure 1B:
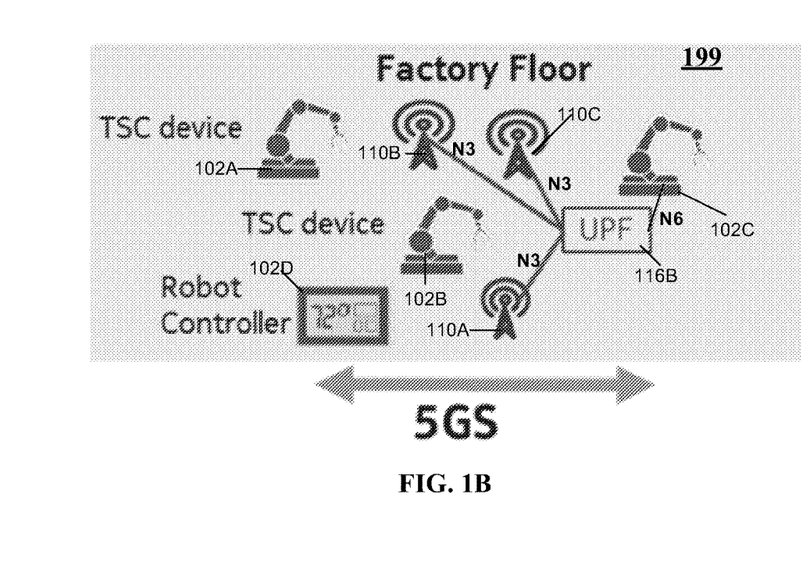

FIG. 1A depicts an example of so-called "direct forwarding" between a gNB base station 110B including a co-located UPF 116B, which is directly coupled to an end station 102C. FIG. 1B is similar to FIG. 1A but the 5G TSC network 199 is configured as a so-called "hub" configuration. Specifically, a plurality of the gNBs 110A-C share the same UPF 116A.

The user plane function (UPF) depicted at FIG. 1A may need to only cover an area of a factory (e.g., assembly floor or paint shop) where robots including end stations are situated (some of which may be mobile as well), although the UPF may cover other areas as well. The example of FIG. 1A shows a plurality of UPFs, although a single UPF may be provided to serve a factory as well. Likewise, although the example of FIG. 1B depicts a single UPF, other quantities of UPFs may be implemented as well.

FIG. 1A depicts end stations 102A-D. The end stations may include radio circuitry to transmit (e.g., in the case of a "talker") and/or receive (e.g., in the case of a "listener"). The end station may include, or be coupled to, a user equipment to enable transmission and/or reception to a 5G network. Alternatively or additionally, an end station may include TSN circuitry to couple to a wired IEEE TSN network as well.

In the example of FIG. 1A, the end stations 102A-C are each associated with a robot, and end station 102D is associated with a robot controller, although the end stations may be associated with other types of devices as well. Moreover, end stations 102A-B may transmit to end station 102D via a 5G radio access network to a base station, such as gNB 110A, while end station 102C transmits via a wired connection to a user plane function 116B which is co-located with the gNB 110B to enable user plane traffic access associated with end station 102C. In 5G, the UPF may perform one or more of the following operations: packet routing and forwarding; packet inspection and QoS handling; connecting to the Internet point of presence; provide a mobility anchor for intra-radio access technology and inter radio-access technology handovers; user plane functionality for lawful intercept; and maintenance and reporting of traffic statistics.

The end station 102D (which is associated with the robot controller in this example) may transmit to end stations 102A-B via a 5G radio access network provided by the gNB 110A, or may transmit to end station 102C via the 5G radio access network provided by the gNB 110A or gNB 110B (which is co-located with UPF 102C). In some example embodiments, the communication path between the end stations may be configured by the 5G network with QoS to provide gated scheduling (e.g., specific transmit times and a periodicity for the transmissions) at any nodes on the TSC communication path.

Time sensitive communications associated with industrial deterministic traffic requiring isochronous transmissions can tend to be low bandwidth and limited to a small geographic area associated with all, or a portion of, a factory. The QoS configured by the 5G system may take into account the requirements of the industrial network to provide support for time sensitive communications (e.g., which provides low latency, deterministic data transmission, and high reliability). In some implementations, a single gNB, such as gNB 110A, may serve at least one wirelessly connected end station (e.g., including 100s of end stations) within a coverage area having a given range (e.g., a few meters to kilometers—which may depend on frequency band), and throughputs of 10s to 100s of Mbps. Moreover, the air interface of the radio access network (RAN) and the gNB may provide first-hop transport and aggregation of traffic from one or more end stations. And forwarding between gNBs may be handled directly between gNB including co-located UPFs (e.g., using 3GPP Traffic Steering Rules), or may be handled by a single UPF connected to the gNBs via the N3 interface (which defines the interface between the UPF and the gNB/5G radio access network). In the case of a single UPF 116B connected via the N3 interface to the gNB 110B, scheduled "gated" transmissions for TSC communications may be supported over the N3 interface to provide deterministic traffic associated with time sensitive communications. For example, gNB 110C may transmit over the N3 interface to the UPF 116B in accordance with a gated schedule in accordance with 5G QoS mechanisms.

And, the UPF 116B may transmit over the N6 interface to the end-station 102C in accordance with a gated schedule configured for the UPF 116 in accordance with 5G QoS mechanisms.

In some implementations, a data center (DC) may host a UPF, such as UPF 116A or 116B, to provide a virtualized network node (e.g., a cloud-based UPF which is virtually hosted in the cloud-based data center). When this is the case, the transport network outside of the DC may be considered part of the 5G system and may include wired transport over 3GPP via the N3 to the gNB or via F1 interfaces. The F1 interface defines the interface between a gNB-central unit (CU) and a gNB-distributed unit (DU). The F1 interface may include an F1-C interface and an F1-U interface defining the control plane (C) interface functionality and the user plane (U) interface functionality. The F1 interface may thus define the inter-connection of a gNB-CU and a gNB-DU; support the control plane and user plane separation; support the radio network layer and transport network layer; and enable the exchange of UE associated information and non-UE associated information.

In the example depicted at FIGS. 1A-B, a UPF may be configured to minimize the number of hops for time sensitive communications traffic between end stations. In the case of the gNB co-located UPFs (FIG. 1A at 116B), there may be no N3 interface, so there is no required gate schedule between the gNB 110B and UPF 116B. For example, the gNB and co-located UPF protocol stack may be collapsed, which may eliminate the N3 GTP tunnel. Each gNB and co-located UPF may be directly connected via a wired (or wireless interface) to an end station, without intervening bridges. This co-located gNB/UPF configuration may be appropriate for factories (or portions of a factory) that need lower quantity of gNBs (e.g., approximately 4 or fewer gNBs). In the hub UPF configuration (116A at FIG. 1B), this hub configuration may scale better when there are larger quantities of gNBs (e.g., 4 or more gNBs) within an area serving a group of robots including end-points, although the hub UPF configuration may request gate schedules on N3. In the hub configuration for example, the gNBs may not be co-located with the UPF. As such, there is an N3 interface connecting the gNB and UPF (which may for example be implemented as a wired or fiber backhaul connection). To support TSN on this N3 interface, gated scheduled transmissions would be needed at the gNB (for uplink traffic) and at the UPF (for downlink traffic).

Figure 2A:
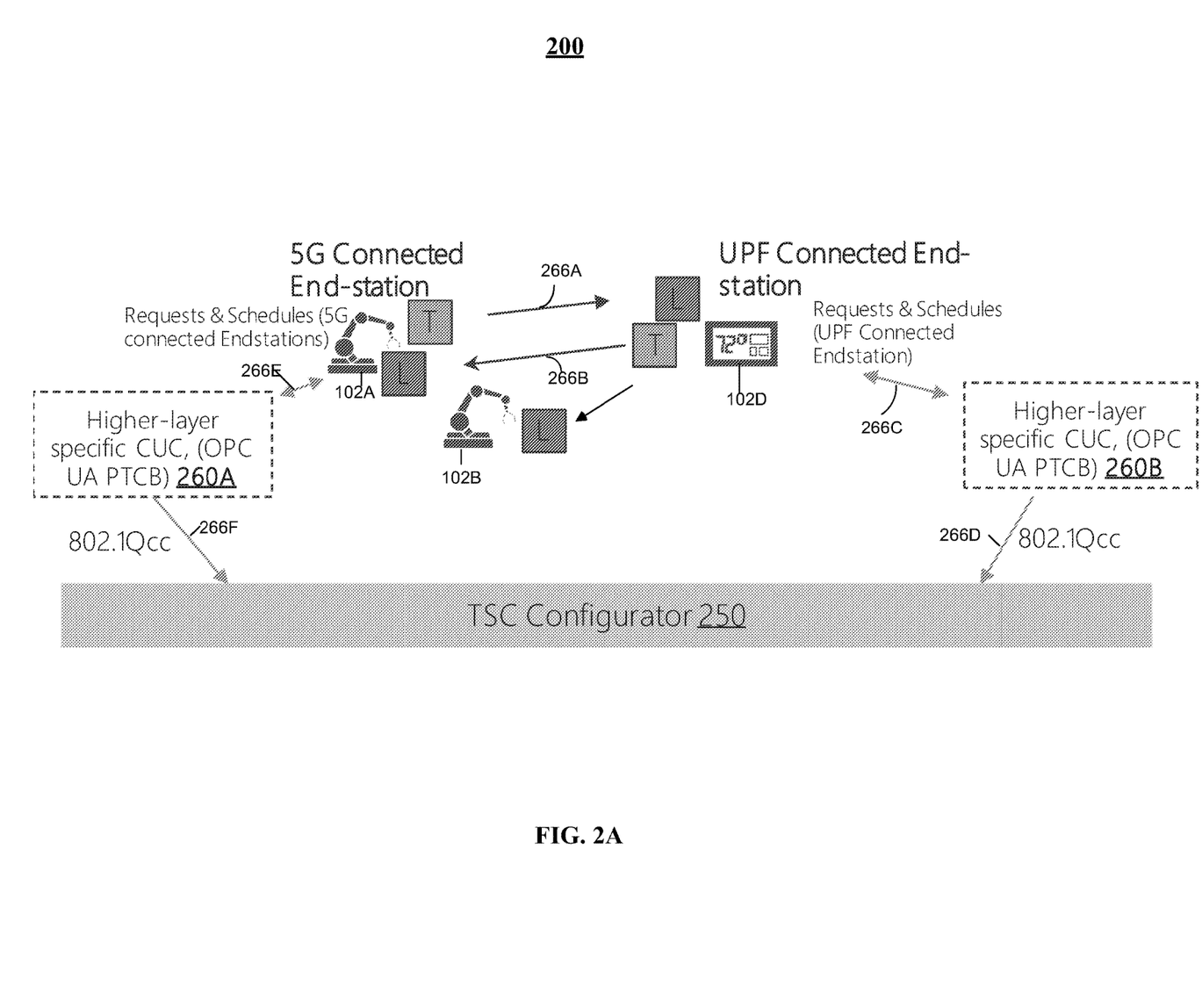
FIGS. 2A-2B depict a portion of the 5G system including a time sensitive communications configurator 250, in accordance with some example embodiments.

FIG. 2A depicts a portion of a 5G TSC network 200, in accordance with some example embodiments.

The TSC network 200 may include end stations 102A, B, and D, for example. End station 102A may wirelessly transmit to the end station 102D via the 5G RAN which contains a gNB base station, and may wirelessly receive transmission from the end station 102D via downlink 266 and the gNB base station. End station 102B may be configured as a second listener ("L") for end station 102D so it may receive wirelessly transmission from the end station 102D via a gNB base station. In the example of FIG. 2, the end station 102D is directly coupled via a wired connection to a UPF co-located with the gNB.

The time sensitive communications among the end stations may be configured with QoS to provide scheduled, gated transmissions to provide deterministic traffic compatible with the IEEE TSN communications. For example, each 5G node along the TSC may its own corresponding gate schedule for a given TSC flow from an end station talker to end station listener(s). The gate schedules may be specified by QoS to provide low delay communication. For example, the gate schedule allows a node to transmit a packet at a pre-assigned gate schedule that tells the node when resources are to be dedicated for transmission of the TSC flow packet(s). The 5G node may be a gNB, a UE, a UPF, and/or an N3 bridge in the path between end stations. Ideally it would be all of them, but practically we are likely to start only with the air-interface. Because the TSC flow may be considered deterministic, before a packet is ever sent, it is known when a 5G node may need to transmit the packet, so resources may be reserved a priori and contention eliminated.

The end stations 102A, B and D may provide to a higher-level node, such as nodes 260A-B, requirements for time sensitive communications. In some example embodiments, the requirements may be provided from a central user configuration (CUC) function to a central network configuration (CNC) function, which may reside in the TSC configurator 250. In some implementations, the TSC configurator may include a CNC (e.g., to program gate schedules in N3 bridges). The CUC and/or CNC may be in accordance with IEEE 802.1Qcc as shown at FIG. 2A. For example, end stations may forward via 266 E and 266 C time sensitive communication requirements to the nodes 260A-B, and the nodes 260A-B may forward these requirements via 266 F and 266 D to the TSC configurator 250. The forwarding of the time sensitive communications requirements may in accordance with IEEE 802.1Qcc as shown at 266D and F. Based on the requirements, the TSC configurator 250 may then generate 5G QoS requirements for the 5G network nodes to configure the time sensitive communications (TSC) paths for the end stations.

In some implementations, the CUC functionality may be implement by an OPC UA publish-and-subscribe TSN configuration broker (PTCB) at nodes 260A-B, although other protocol may be used as well. The OPC UA at nodes 260A-B may be implemented in accordance with Open Platforms Communications (OPC), Unified Architecture (UA). For example, PTCB may be used at nodes 260A-B to forward the requirements to a CNC or to the TSC Configurator 250, which schedules TSC streams and reports the result back to the PTCB at nodes 260A-B. The PTCB may also configure end stations regarding how to use the scheduled, gated streams.

In some example embodiments, the TSC configuration 250 configures, as noted, QoS on 5G network nodes to provide TSC communication paths, so that there are scheduled, gated transmissions to support end stations over the 5G system. In other words, the TSC configurator 250 may configure the 5G system with TSC paths having a 5G QoS compatible with those typically provided by IEEE TSN. In doing so, the TSC configurator may configure one or more 5G nodes (e.g., a UE, a gNB, a UPF, an N3 bridge, and/or the like) in the 5G system, so there are scheduled, gated transmissions on the TSC path.

In some example embodiments, the TSC configurator 250 may appear as a CNC on the northbound interface to the end stations 102A-C, nodes 260A-B (e.g., as a CUC), etc., but the TSC configurator may appear as a 3GPP Application Function (AF) on the southbound interface to the policy control function (PCF), network exposure function (NEF), and/or the like. The PCF may be configured to provide a unified policy framework, provide policy rules to control plane functions, access subscription information for policy decisions, and/or the like. The NEF may be configured to expose capabilities and events, secure provision of information from external application to 3GPP network, translate of internal/external information, and/or the like.

In some example embodiments, the nodes 260A-B may trigger path setup by the TSC Configurator 250 of isochronous user plane traffic between a talker end station (which transmits) and a listener end station (which receives).

In some example embodiments, the TSC configurator 250 may calculate required scheduled gate times for nodes or functions within the 5G system, when isochronous transmission is needed for time sensitive communication. Each 5G node may have gate times specifying absolute times for transmission of TSC traffic as well as the periodicity of those transmissions.

In some example embodiments, the TSC configurator 250 may directly configure any N3 bridges within the 5G system with required gate schedules. For example, each node (e.g., element, AF, N3 bridge, etc.) that forwards a frame between a talker and a listener may be configured with QoS to provide a gate schedule. In the case of the N3 interface between the gNB and UPF, there may be a bridged backhaul link or network. As such, any N3 bridges may be configured with QoS to provide a gate schedule.

Figure 2B:
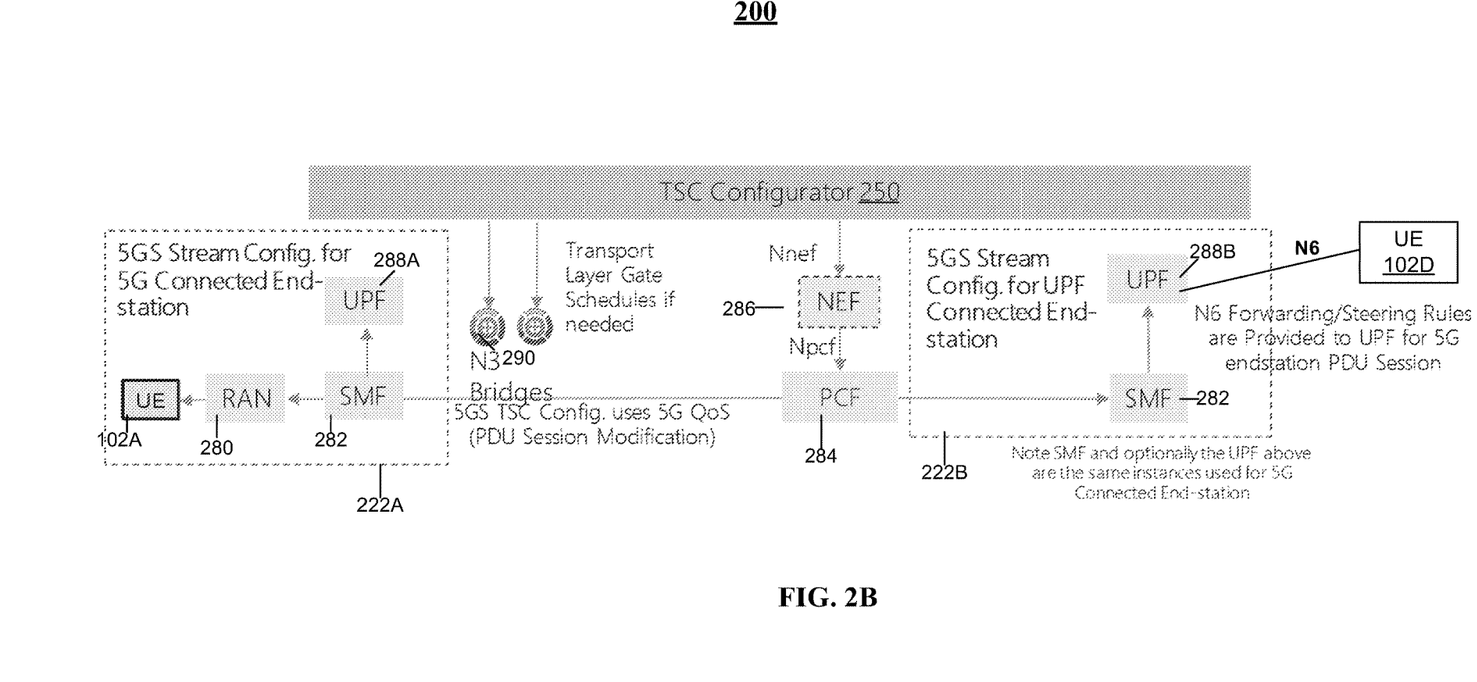

FIG. 2B depicts a portion of a 5G network including the TSC configurator 250, in accordance with some example embodiments. The end stations, such as end stations 102A and 102D, may include radio access technology to enable access to the 5G radio access network 280 being served by a gNB, such as gNB 110A or 110B. In the example of FIG. 2B, the end stations 102A and 102D include such technology as shown by the "UE" at 102A and D.

In some example embodiments, the TSC configurator 250 may trigger the NEF 286, PCF 284, and/or session management function (SMF) 282 to provide a QoS configuration including gate schedules to one or more of the UPF 288A and the radio access network 280 and/or provide a QoS configuration including gate schedules to the UPF 288B. The TSC configurator 250 may also configure the gate schedules for transmission at the N3 bridges 290, in accordance with some example embodiments. In some embodiments, only the RAN 280 may be provided a gate schedule. In some other embodiments, some if not all of the elements in a path (which is between a talker end station and at least one listener end station) may be provided with gate schedules.

In the example of FIG. 2B, the configuration at 222A represents an end station 102A coupled wirelessly to the 5G RAN, while the configuration 222B represents an end station 102D which is directly coupled (e.g., with a wired connection) to a UPF 288B co-located at a gNB as described with respect to FIGS. 1A at 110B/116B.

Figure 3:
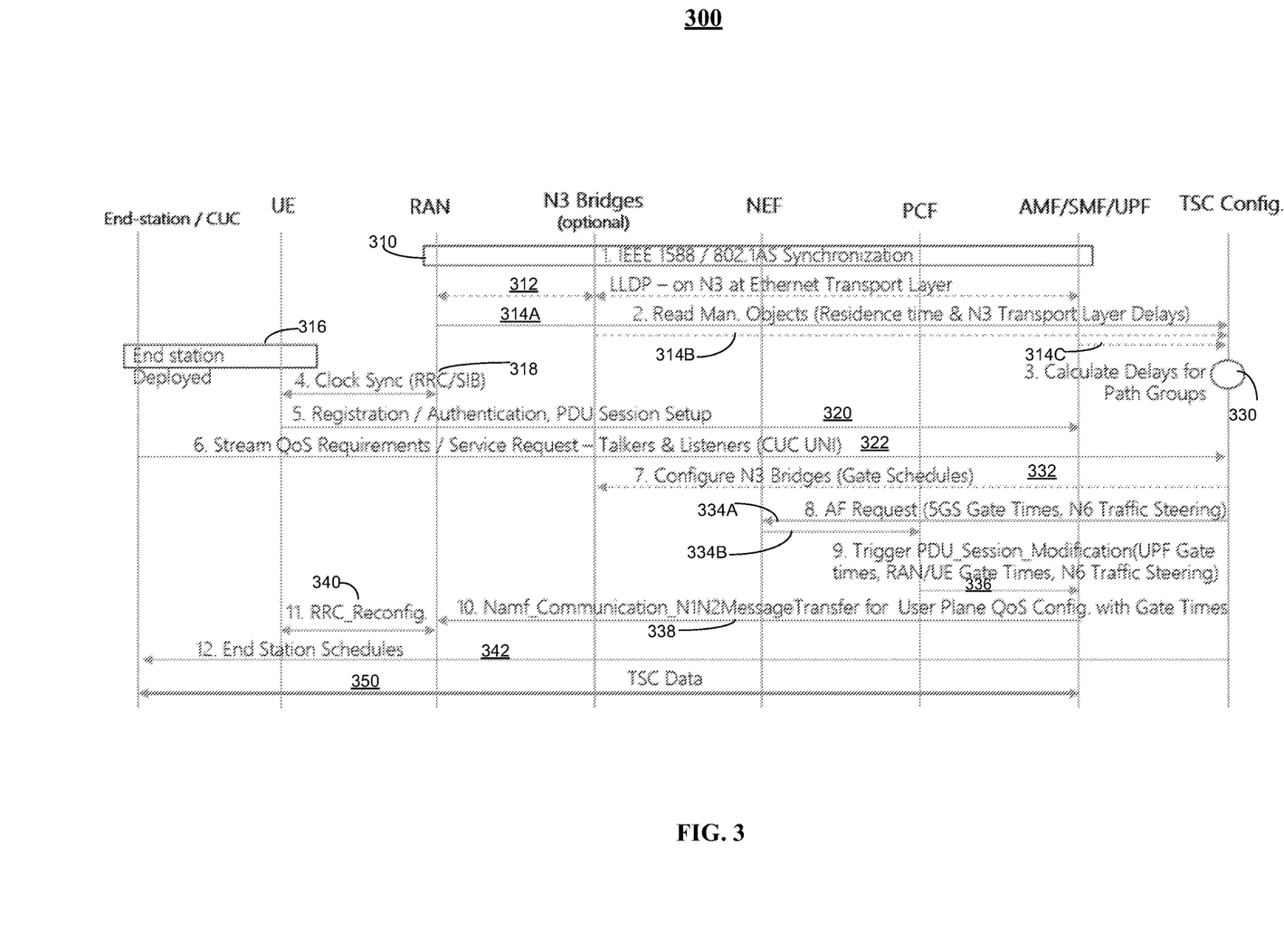
FIG. 3 depicts an example process for configuring 5G nodes for time sensitive communications, in accordance with some example embodiments.

FIG. 3 depicts an example of a process 300 to configure the 5G system for time sensitive communications, in accordance with some example embodiments. The process 300 may provide the 5G system with a configuration to support low delay, deterministic networking, such as TSC.

At 310, some (if not all) 5G nodes, for which a TSC path is to be configured from a talker to a listener, are synchronized to a clock, such as a grand master (GM) clock source. For example, this synchronization may include the UPFs 288A-B, RAN 280 (e.g., the corresponding gNBs), N3 bridges 290, and/or the like. These 5G nodes may be coupled by a backhaul which may include a wired connection, although it may include a wireless backhaul as well.

At 312, link layer discovery may be performed. For example, link layer discovery, such as LLDP and 802.1AB-based discovery, may be used to discover Ethernet connectivity at the transport layer on the N3 interface. This discovery may include Ethernet connectivity provided between a gNB and UPF ports, such as between UPF 116B and gNB 110B (FIG. 1A), gNB 110A and UPF 116A (FIG. 1A), UPF 116B and gNBs 110A-C (FIG. 1B).

At 314A-C, the TSC configurator 250 may read managed objects from network nodes or functions, such as the gNBs, N3 bridges, AMFs, SMFs, UPFs, and/or other nodes, to obtain a topology including transport layer delay times.

At 316, one or more end stations 102A-C may be deployed. For example, end station 102A and 102C may be deployed as a robot (102A) and a robot controller (102C). These end stations may be associated with a CUC, such as nodes 260A-B, implemented by a protocol framework such as OPC UA as noted above. The end stations may include a user equipment (UE) circuitry to enable access to the 5G system including the 5G RAN being served by the gNB, although the end station may couple via a wired connection directly to a UPF co-located with a gNB or a UPF which is separate from gNBs. At 318, the deployed end station may have their clocks synchronized with the 5G system and, in particular, the RAN (which was previously synchronized at 310) being served by the gNB. The end station synchronization at 318 may be performed via a system information broadcast (SIB) message, radio resource control (RRC) messaging, and/or by other techniques.

At 320, the end station/UE may register, authenticate, and set up a protocol data unit (PDU) session with the 5G system.

At 322, the nodes 260A-B (which may be configured as a CUC as noted above) may forward requirements to the TSC configurator 250, in accordance with some example embodiments. For example, the forwarded requirements may include QoS requirements (which specify time sensitive requirements or other types of requirements) for one or more end stations. These forwarded requirements may enable the TSC configurator to determine the QoS for the TSC communication path between a pair of end stations, for example. These requirements may include the deterministic and isochronous communication paths requirements between the takers (e.g., end station UEs transmitting TSC traffic) and listeners (e.g., end station UEs receiving TSC traffic).

At 330, the TSC configurator 250 may calculate, based on the information received at 314A-C and/or 322, path delays between talker(s) and listener(s). For example, the TSC configurator may determine path delay at nodes along a TSC path between a talker end station and a listener end station. In some example embodiments, the path delay may be used to compute gate schedules for some, if not all, of the nodes/functions in the path, to provide deterministic and isochronous time sensitive communication paths between a talker and a listener. Referring to FIG. 1B for example, the TSC may determine a gated schedule for the 5G air interface which would dictate when end station 102B would transmit via an uplink to gNB 110B; determine a gated schedule for an N3 bridge's transmission from the gNB 110B and UPF 116B; and determine a gated schedule for the UPF's 116B transmission via the N6 to the end station 102C.

At 332, the TSC configurator 250 may configure the N3 bridges 290 with gate schedules determined at 330.

At 334A, the TSC configurator 250 (which may act as an Application Function) may request a setup of a TSC bearer, in accordance with some example embodiments. The request at 334A may be sent to the NEF 286. The request may include a gate schedule (e.g., a gate time(s) for transmission, periodicity of transmission, etc.) for one or more elements (e.g., 5G nodes or application functions) in the TSC communication path between talker and listener, and other stream requirements (e.g., frame size information, bandwidth requirement, etc.). The NEF 286 may forward, at 334B, the request to the PCF 284. In some example embodiments, the TSC configurator 250 may send the TSC bearer request at 334A to the PCF 284.

At 336, the PCF 284 may trigger a PDU session modification to setup TSC QoS including the configuration of gate schedules (e.g., a gate time(s) for transmission, periodicity of transmission, etc.), in accordance with some example embodiments. For example, the PCF 284 may send a PDU session modification request (or establishment) message to the SMF 282. This message may include the gate schedules, such as gate times for the UPF, RAN, N3 bridge(s), and/or UEs. Gate schedules for the UPF may include schedules for forwarding on the N6 interface between UPFs (e.g., UPF 116A and UPF 116B in FIG. 1B). Forwarding on the N6 interface may be based on 3GPP traffic steering rules, which may be modified to accommodate gate schedules.

At 338, the SMF may provide to the applicable RANs and UPFs scheduled gate times as well as other stream information. For example, the SMF may send via the AMF a Namf message to the UE and RAN, a user plane QoS configuration including the determined gate schedules. For example, the scheduled gates times may represent the specific transmit times for the UE and gNB. Alternatively or additionally, the scheduled gate times may correspond to a cycle start time parameter and a repeat period. Alternatively or additionally, the scheduled gate times may correspond to a delay from a known time.

At 340, the UE may configured with the QoS configuration including the determined gate schedules. In some example embodiments, the gating start time may be a clock time. In some example embodiments, the gating start time may represented by an offset from a time already known to the UE, RAN, N3 bridge, and/or UPF.

At 342, TSC configurator 250 may also supply the end station, via the CUC, with one or more gate schedules. For example, a robot end station talker may be informed of the schedule to supply deterministic traffic to the UE for transmission through the path to the listener. In this example, the UE may be coupled to, or included in, the end station talker.

At 350, the TSC data traffic may begin to flow over the 5G network. The TSC data traffic between end stations may have a QoS that provides deterministic, isochronous traffic transmission having low delay (or latency) and the like. Referring to FIG. 1B for example, the end station 102B including the UE may transmit, in accordance with the UE's QoS for gated scheduling, the TSC traffic over the 5G air interface (e.g., via an uplink to gNB 110B). The gNB 110B and/or N3 bridge may each transmit, in accordance with the corresponding QoS for gated scheduling, the TSC traffic to the UPF 116B. And, the UPF 116B may transmit, in accordance with the UPF's QoS/gated schedule via the N6 to the end station 102C.

Figure 4A:
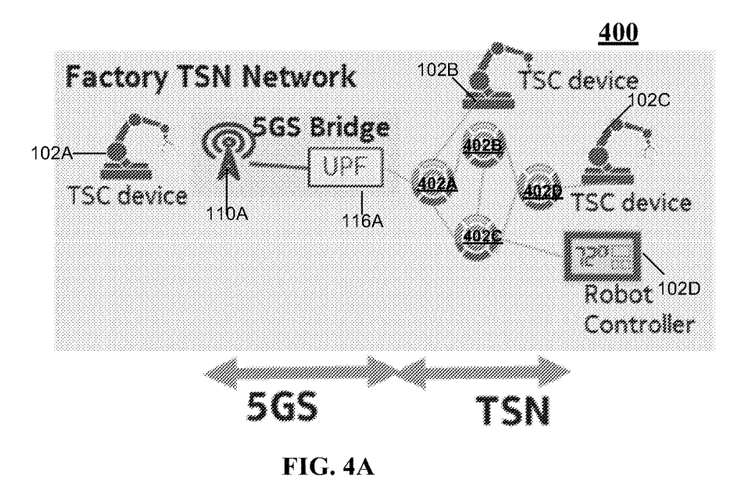
FIGS. 4A-4B depict additional examples of portions of a 5G system configured to provide time sensitive communications between end stations, in accordance with some example embodiments.

FIG. 4A depicts another example of a portion of a 5G TSC network 400, in accordance with some example embodiments. The example of FIG. 4A is similar to FIGS. 1A-B in some respects but includes the 5G system serve as a bridge between the end station 102A accessing a 5G RAN via a so-called "5G Bridge" comprising the gNB 110A and a co-located UPF 116A. The UPF 116A is further coupled to a traditional TSN including nodes 402A-402D coupled to end stations 102B, C, and D. Nodes 402A-402D may comprise an industrial Ethernet network, and may individually be Ethernet bridges supporting TSN networking according to IEEE TSN Standards, such as IEEE 802.1Qcc, IEEE 802.1Qbv, IEEE 802.1CB, and the like. The process 300 described herein may be implemented at FIG. 4A as well. For example, the TSC configurator may discover at 312 and obtain at 314A-C (and/or 322) information regarding the transport layer including delay. The TSC configurator 250 may calculate delays allocated to nodes in the 5G system and the TSN system, when the TSC path is between for example end station 102A and end station 102D, for example. Moreover, the TSC configurator 250 may provide the QoS information as scheduled gate times to the RAN, end stations, and corresponding N3 bridges, such as the N3 bridge at UPF 116A interfacing gNB 110A and the TSN network (e.g., TSN nodes 402A-D).

Low latency may be achieved using gate scheduling parameters, which may indicate or represent when each node will transmit packets associated with an identified TSC traffic stream. Gate times may be derived for each node in the network including the 5G bridge using 802.1Qcc, 802.1Qbv and other TSN protocols, for example. At the proscribed gate time, a pre-defined set of resources within a node will be available for transmission of frames for a TSC traffic stream. In the case of a 5G node, an expected minimum delay QoS parameter and a maximum delay QoS parameter may be used to define in the 5G system an arrival time window and 5G system transmit time window.

Figure 4B:
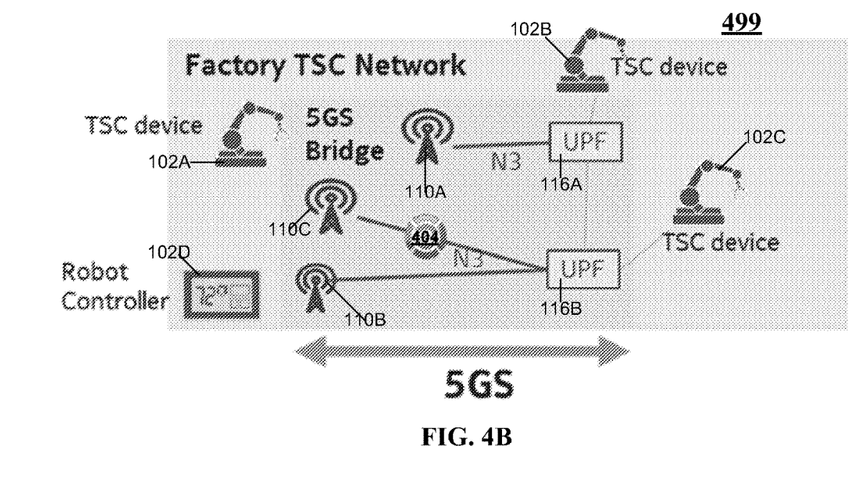

FIG. 4B depicts another example of a portion of a 5G TSC network 400, in accordance with some example embodiments. The example of FIG. 4A is similar to FIG. 4B in some respects but shows a more dominant 5G system between a talker end station and a listener. When both TSC end stations, such as between 102A and 102D, are connected by 5G access or a wired TSC end station, such as 102B or 102B, is directly connected to a UPF (e.g., UPF 116A or B), the path may only include 5G nodes, so no external TSN network interaction may be necessary as illustrated in FIG. 4B.

As noted, support for deterministic, time sensitive communications may be needed between end stations, when the end stations require low latency, isochronous communication, which may be achieved if elements/nodes in the TSC communication path between the end stations transmit periodically at specified gate times, such as is the case for wired IEEE TSN networks. For scenarios where each bridge between end stations in a wired TSN network would otherwise need to be configured with gate schedules, interfaces within a 5G system that is providing some (if not all) of the user plane traffic may also be similarly configured.

In some example embodiments, the user plane path may be configured through the 5G system, wherein some, if not all, 5G nodes or application functions (e.g., UE, gNB-DU, gNB-CU, gNB, UPF, N3 bridges, etc.) are assigned a gate schedule that includes a transmission time. This may reduce or minimize end-to-end delay at least through the 5G system. In some example embodiments, gate schedules for the 5G nodes may be configured via 5G QoS as noted. In the RAN, support for a gate schedule may be implemented as a semi-persistent scheduling, occurring at a specified clock time. In some example embodiments, an AF, such as a TSC configurator, may determine gate schedules, and the AF may provide gate schedules for 5G components that reside between end stations. The TSC configurator may use 802.1Qcc, 802.1Qbv, and/or other IEEE TSN related protocols to learn, at the transport layer, the wired 5G user plane topology, and to read delay related managed objects. The TSC configurator may also receive end station information from a CUC and calculate an end-to-end path between the end stations. As the 5G RAN schedules uplink transmissions from an end station (or UE), the end stations's gate schedule may be provided to the 5G RAN via 5G QoS, in accordance with some example embodiments.

Figure 5:
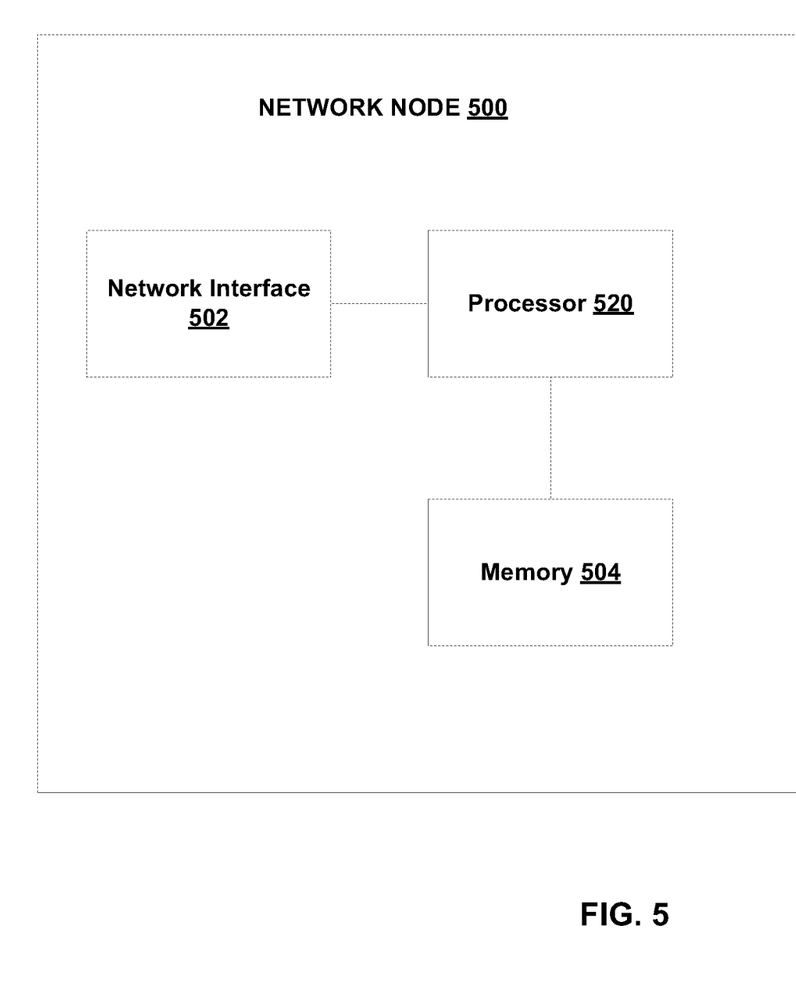
FIG. 5 depicts an example of a network node, in accordance with some exemplary embodiments.

FIG. 5 depicts a block diagram of a network node 500, in accordance with some example embodiments. The network node 500 may be configured as a gNB base station, UPF, PCF, AMF, SMF, TSC configurator, N3 bridges, and/or the like. The network node 500 may include a network interface 502, a processor 520, and a memory 504, in accordance with some example embodiments. The network interface 502 may couple to backhaul links to other nodes. These backhaul links may be wired and/or wireless. In the case of the gNB, it includes 5G radio access technology transceivers to provide a 5G radio access network. The memory 504 may comprise volatile and/or non-volatile memory including program code, which when executed by at least one processor 520 provides, among other things, the processes disclosed herein with respect to the base station.

For example, in some example embodiments, the network node may be implemented as an application function (e.g., TSC configurator 250 or some other type of AF) and may generate, based on a time sensitive communication requirement for one or more end stations, at least one quality of service parameter for a time sensitive communication path from a talker end station through at least a portion of a 5G system to a listener end station, The at least one quality of service parameter may be indicative of a scheduled gate time for transmission at one or more 5G nodes in the time sensitive communication path, The network node may send a request towards a policy control function. The request may include the at least one quality of service parameter configured to enable a creation, at the one or more 5G nodes, of a quality of service flow in accordance with the at least one quality of service parameter. The one or more 5G nodes comprise a user plane function, at least one base station, and/or other types of nodes.

The network node 300 may also be implemented as a 5G node, such as a UPF, gNB, and/or other type of node as disclosed herein. When that is the case the network node may receive, in a time sensitive communication path from a talker end station through at least a portion of a 5G system to a listener end station, a request including at least one quality of service parameter indicative of a scheduled gate time for transmission and/or reception at the 5G node on the time sensitive communication path. The network node may create a quality of service flow in accordance with the at least one quality of service parameter indicative of a scheduled gate time for transmission and/or reception at the 5G node on the time sensitive communication path.

Figure 6:
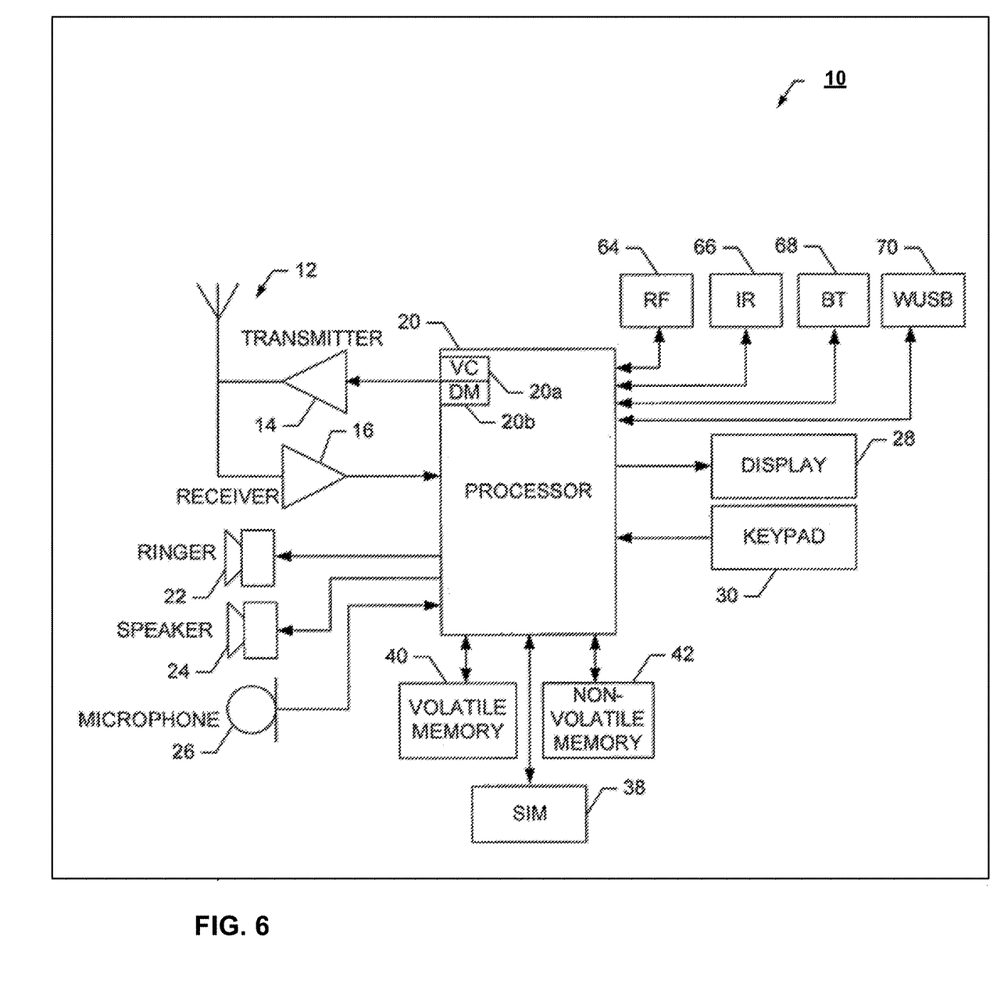
FIG. 6 depicts an example of an apparatus, in accordance with some exemplary embodiments.

FIG. 6 illustrates a block diagram of an apparatus 10, in accordance with some example embodiments. The apparatus 10 (or portions thereof) may be configured to provide an end station including cellular radio access technology. The user equipment may comprise or may be comprised in an end station. The end station including user equipment may be configured to transmit and receive (listener and talker), configured to only receive (e.g., listener), and/or configured to only transmit (talker).

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 6 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth generation (5G), Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE. For example, the apparatus 10 may be capable of operating in accordance with 5G wireless communication protocols, such as 3GPP NR, NG-RAN, and/or the like. Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 112 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 6, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 112 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the end stations/user equipment. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the the nodes disclosed herein. For example, the apparatus may receive at least one quality of service parameter indicative of a scheduled gate time for transmission on a time sensitive communication path through at least a portion of a 5G system and transmit one or more packets at the scheduled gate time towards a 5G node.

Some of the embodiments disclosed herein may be implemented in software, hardware, application logic, or a combination of software, hardware, and application logic. The software, application logic, and/or hardware may reside on memory 40, the control apparatus 20, or electronic components, for example.

In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is improved 5G support for time sensitive communications.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
   receiving, at an end station including a user equipment or at a 5G node, a message from a session management function, the message including at least one quality of service parameter indicative of a scheduled gate timing for transmission and/or reception on a time sensitive communication, wherein the time sensitive communication is from a talker end station including the user equipment or the 5G node of a 5G system to a listener end station, without an external time sensitive network; and
   transmitting, at the end station including the user equipment or the 5G node, one or more packets in accordance with a quality of service using the at least one quality of service parameter indicative of the scheduled gate timing for transmission and/or reception.

2. The method of claim 1, wherein the 5G node comprises a base station and/or a user plane function.

3. The method of claim 1, further comprising creating a quality of service flow in accordance with the at least one quality of service parameter indicative of the scheduled gate timing for transmission and/or reception at the 5G node on the time sensitive communication.

4. The method of claim 1, wherein the end station including the user equipment directly couples to a user plane function via an N6 interface, and/or wherein the 5G node comprises a gNB.

5. The method of claim 1, wherein the at least one quality of service parameter indicative of the scheduled gate timing is determined based on a transport delay between the talker end station and the listener end station, and/or wherein the end station including the user equipment comprises the talker end station.

6. The method of claim 1, wherein the scheduled gate timing comprises a clock time.

7. The method of claim 1, wherein the scheduled gate timing represents an offset from a time known to the user equipment, a radio access node, an N3 bridge, and/or a user plane function.

8. An apparatus comprising:
   at least one processor; and
   at least one memory including computer program code, the at least one memory and the computer program code configured to, with the at least one processor, cause the apparatus to at least:
   receive, from a session management function, a message including at least one quality of service parameter indicative of a scheduled gate timing for transmission and/or reception on a time sensitive communication, wherein the time sensitive communication is from a talker end station including the apparatus to a listener end station, without an external time sensitive network, wherein the apparatus comprises or is comprised in an end station including a user equipment or in a 5G node; and
   transmit one or more packets in accordance with a quality of service at the scheduled gate time using the at least one quality of service parameter indicative of the scheduled gate timing for transmission and/or reception.

9. The apparatus of claim 8, is further configured to create a quality of service flow in accordance with the at least one quality of service parameter indicative of the scheduled gate timing for transmission and/or reception at the 5G node on the time sensitive communication.

10. The apparatus of claim 8, wherein the 5G node comprises a base station and/or a user plane function.

11. The apparatus of claim 8, wherein the at least one quality of service parameter indicative of the scheduled gate timing is determined based on a transport delay between the talker end station and the listener end station, and/or wherein the end station including the user equipment comprises the talker end station.

12. The apparatus of claim 8, wherein the end station including the user equipment directly couples to a user plane function via an N6 interface, and/or wherein the 5G node comprises a gNB.

* * * * *